(12) United States Patent
Roth et al.

(10) Patent No.: US 7,953,541 B2
(45) Date of Patent: May 31, 2011

(54) METHOD AND SYSTEM FOR REDUCING UNBURNED FUEL AND OIL FROM EXHAUST MANIFOLDS

(75) Inventors: John Stephen Roth, Millcreek Township, PA (US); Kyle Craig Stott, Erie, PA (US); James Robert Mischler, Franklin Township, PA (US); Paul Flynn, Fairview, PA (US); Kirk Heywood, Erie, PA (US); Daniel Allan Moser, Erie, PA (US)

(73) Assignee: General Electric Company, Schenectady, NY (US)

( * ) Notice: Subject to any disclaimer, the term of this patent is extended or adjusted under 35 U.S.C. 154(b) by 484 days.

(21) Appl. No.: 12/184,141

(22) Filed: Jul. 31, 2008

(65) Prior Publication Data

US 2010/0030448 A1 Feb. 4, 2010

(51) Int. Cl.
*F02D 41/00* (2006.01)
*G06F 19/00* (2011.01)

(52) U.S. Cl. .................................. 701/103; 123/73 AD

(58) Field of Classification Search .......... 701/103-105, 701/115, 102; 123/73 AD, 196 R
See application file for complete search history.

(56) References Cited

U.S. PATENT DOCUMENTS

| | | | | |
|---|---|---|---|---|
| 4,254,752 | A | 3/1981 | Friddell et al. | |
| 5,408,973 | A | 4/1995 | Spangjer | |
| 6,283,072 | B1 * | 9/2001 | Lavy et al. | 123/196 R |
| 6,476,722 | B1 * | 11/2002 | Bidone | 340/584 |
| 6,604,515 | B2 | 8/2003 | Marsh et al. | |
| 6,904,879 | B2 * | 6/2005 | Kato | 123/73 AD |
| 7,131,403 | B1 | 11/2006 | Banga et al. | |
| 7,296,555 | B2 | 11/2007 | Tamma et al. | |
| 7,360,522 | B2 | 4/2008 | Tamma et al. | |
| 2007/0125324 | A1 * | 6/2007 | Houston | 123/73 AD |

* cited by examiner

*Primary Examiner* — Hieu T Vo

(74) *Attorney, Agent, or Firm* — Robert Wawrzyn; Alleman Hall McCoy Russell & Tuttle LLP

(57) ABSTRACT

Methods and systems are provided for operating an internal combustion engine having an exhaust system and a plurality of cylinders that utilize fuel and/or oil for combustion and engine lubrication purposes. In one example, a method comprises, while the engine is operating in a low-load mode or an idle mode, successively operating distinct subsets of said cylinders at a cylinder load sufficient to increase an exhaust temperature for burning unburned fuel and/or oil deposited in the cylinders or engine exhaust system. Herein, each successively operated subset comprises at least one but fewer than all of the plurality of cylinders, and the cylinders that are not currently being operated in a subset are operated in a low- or no-fuel mode.

22 Claims, 5 Drawing Sheets

METHOD AND SYSTEM FOR REDUCING UNBURNED FUEL AND OIL FROM EXHAUST MANIFOLDS

FIELD

The subject matter disclosed herein relates to internal combustion engines and, more particularly, to methods and systems for controlling internal combustion engines.

BACKGROUND

Locomotives or other vehicles, such as ships, may be configured with lubrication systems wherein pressurized oil is used to lubricate and/or cool engine valvetrain components, camshaft assemblies, pistons, and related engine components. Such oil systems may be configured to supply sufficient oil for engine operation at full load.

In some engines, such as large bore engines designed for significant operation under full load, oil from the lubrication system may be retained in the grooves of a cylinder wall and can eventually enter an exhaust system or engine stack. In particular, unburned fuel from combustion during low load conditions can contribute to the accumulation and deposition of unburned fuel and oil in the exhaust system, especially during reduced exhaust port temperatures.

One approach to address such deposits involves regular exhaust system maintenance. In one example, exhaust stack maintenance may entail service personnel climbing onto the top surface of a locomotive and manually cleaning the exhaust system. However, the need for frequent exhaust system maintenance compounded with the use of complicated manual maneuvers therein may thereby introduce unwanted delays in the operation.

BRIEF DESCRIPTION OF THE INVENTION

Methods and systems are provided for removing unburned fuel and/or oil from the exhaust manifold of an engine. In one embodiment, a method for operating an internal combustion engine having an exhaust system and a plurality of cylinders that utilize fuel and/or oil for combustion and engine lubrication purposes comprises, while the engine is operating in a low-load mode or an idle mode, successively operating distinct subsets of said cylinders at a cylinder load sufficient to increase an exhaust temperature of the engine for burning unburned fuel and/or oil deposited in the cylinders and engine exhaust system. The successively operated subset may include at least one, but fewer than all, of the plurality of cylinders. Further still, the cylinders that are not currently being operated may be operated in a low- or no-fuel mode.

Another embodiment uses a method for operating an internal combustion engine with a plurality of cylinders, the cylinders operating in at least two modes, a first mode with a lower fuel injection amount, and a second mode with a higher fuel injection amount. The method comprises operating at least one of the cylinders of the engine in the second mode while at least another cylinder operates in the first mode to increase exhaust temperature of the at least one cylinder in the second mode after a designated amount of low-load engine operation, and during low-load engine operation. In this way, unburned fuel and/oil accumulating in an engine exhaust system may be removed with reduced need for manual intervention, thereby reducing related costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further still, the inventors herein have recognized the above issues and potential approaches to address them.

BRIEF DESCRIPTION OF THE DRAWINGS

The present invention will be better understood from reading the following description of non-limiting embodiments, with reference to the attached drawings, wherein below.

DETAILED DESCRIPTION

Engine of locomotives, or other vehicles such as ships, may be configured with lubrication systems that provide oil for lubricating valvetrains, pistons and other related engine components. The lubricating system may be further configured to interact with an engine controlled by an engine control system to enable unburned oil and/or fuel that may have accumulated in the engine exhaust manifold during the course of engine operation to be burned in order to reduce fouling the engine's exhaust system. One example of such a configuration is illustrated with reference to FIG. 1 wherein a lubricating system interacts with a locomotive engine to provide lubrication during engine operation, where an engine controller enables regular exhaust maintenance. As further elaborated in FIGS. 2-3, control routines may be performed to determine if an engine has idled (or operated at low-load) for enough time to warrant a pre-emptive exhaust maintenance procedure. If so, further based on the engine load conditions, a target cylinder (or a target subset of cylinders) may be selected for a port heating routine. Herein, the exhaust port of a target cylinder may be heated to a temperature at which the accumulated oil and/or fuel may be removed or reduced by combustion and/or oxidation. Concurrently, the remaining cylinders may be operated in a low-load or a no-load (e.g., fuel-deactivated) mode. Upon a request for a high- or mid-engine load, the port heating routine may be suspended or resumed at a later condition when the engine is idling or operating at low-load. Some example situations are elaborated in FIGS. 4A-B. In this way, engine exhaust systems may be maintained with reduced human intervention, and further with reduced effects on engine performance.

Figure 1:
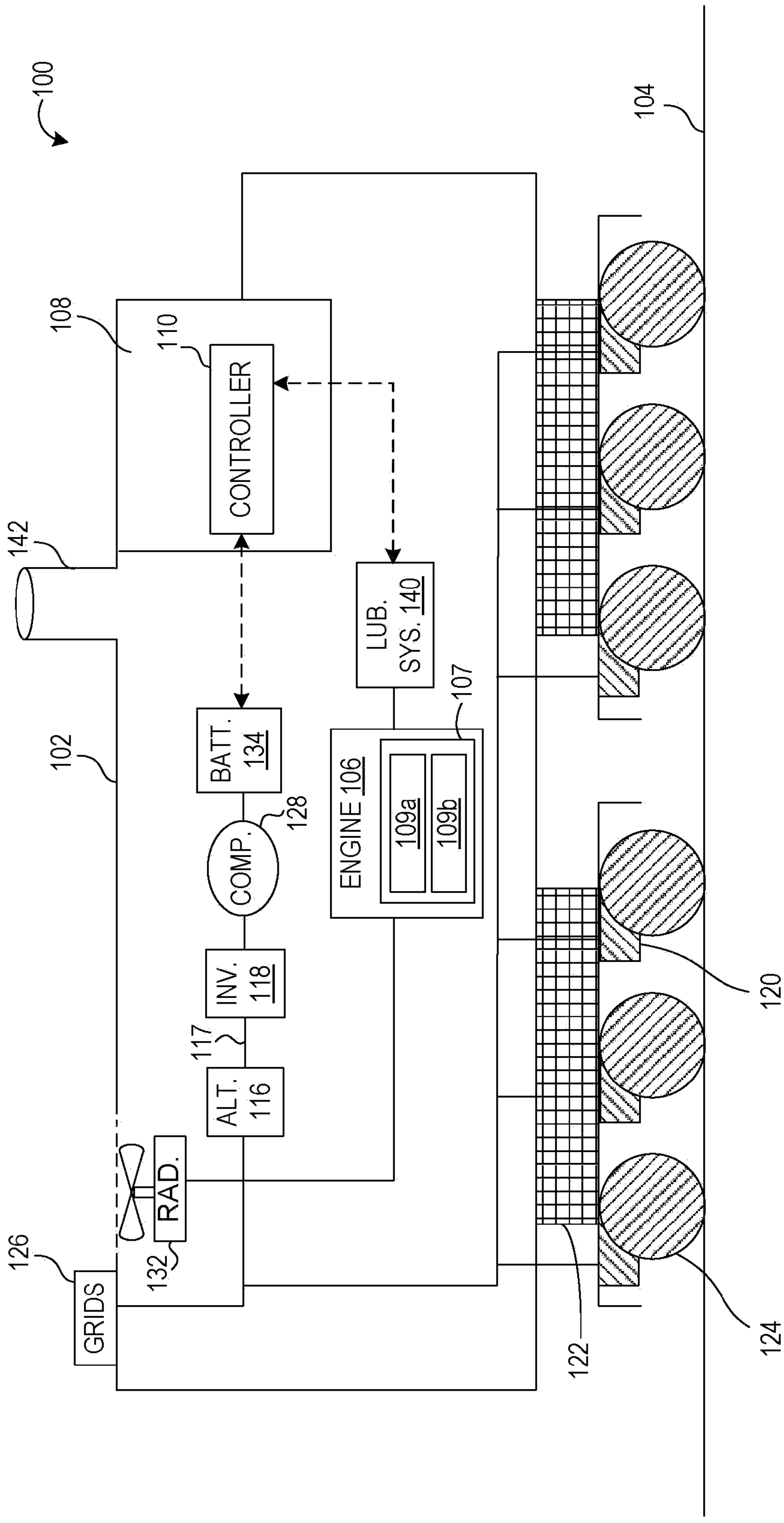
FIG. 1 shows an example embodiment of a diesel-electric locomotive.

FIG. 1 is a block diagram of an example vehicle system for a locomotive 100, configured to run on track 104. As depicted herein, in one example, the locomotive is a diesel electric vehicle operating a diesel engine 106 located within a main engine housing 102. Engine 106 may consume or utilize various fuels and oils, such as diesel fuel and lubricating oil, for example. Engine 106 includes a plurality of cylinders 107. In one example, engine 106 includes twelve cylinders (two banks of six cylinders each). Further, the plurality of cylinders 107 in the engine 106 may include various sets and sub-sets of cylinders, such as a first sub-set of cylinders 109*a* and a second sub-set of cylinders 109*b*. The various sets and sub-sets of cylinders may include one or more cylinder groups for selected operating modes, as described herein.

In alternate embodiments, alternate engine configurations may be employed, such as a gasoline engine or a biodiesel or natural gas engine, for example. While this example illustrates a locomotive 100, in alternative embodiments the vehicle may be a ship. Further still, the engine may be operated in a stationary power generation system.

Returning to FIG. 1, locomotive operating crew and electronic components involved in locomotive systems control and management, for example controller 110, may be housed within a locomotive cab 108. In one example, controller 110 may include a computer control system, as well as an engine control system. The locomotive control system may further comprise computer readable storage media including code for enabling an on-board monitoring and control of locomotive operation. Controller 110, overseeing locomotive systems control and management, may be configured to receive signals from a variety of sources in order to estimate locomotive operating parameters. Controller 110 may be further linked to a display (not shown) to provide a user interface to the locomotive operating crew. In one embodiment, controller 110 may be configured to operate with an automatic engine start/stop (AESS) control system on an idle locomotive 100, thereby enabling the locomotive engine to be automatically started and stopped upon fulfillment of AESS criteria as managed by an AESS control routine.

Engine 106 may be started with an engine starting system. In one example, a generator start may be performed wherein the electrical energy produced by a generator or alternator 116 may be used to start engine 106. Alternatively, the engine starting system may comprise a motor, such as an electric starter motor, or a compressed air motor, for example. It will also be appreciated that the engine may be started using energy from an energy storage device, such as a battery, or other appropriate energy source.

The diesel engine 106 generates a torque that is transmitted to an alternator 116 along a drive shaft (not shown). The generated torque is used by alternator 116 to generate electricity for subsequent propagation of the vehicle. The electrical power generated in this manner may be referred to as the prime mover power. The electrical power may be transmitted along an electrical bus 117 to a variety of downstream electrical components. Based on the nature of the generated electrical output, the electrical bus may be a direct current (DC) bus (as depicted) or an alternating current (AC) bus.

Locomotive engine 106 may be operated under a plurality of load levels, ranging from idle on the low end, to peak engine output on the high end. Low engine load may include operation at a lower end of the engine load range. Mid engine load may include operation at a mid level engine load range above low load. High engine load may include operation at a higher end of the engine load range, above mid engine load. Further, it should be appreciated that while the engine as a whole may operate at a given engine load, each cylinder may have a variable cylinder load ranging also from low-load to high-load. While engine load and cylinder load may coincide, this is not already required. For example, the engine overall may be operated under low load, however, some cylinders may be operated at substantially no-load (e.g., deactivated), while other cylinders operate at a mid- to high-load, depending on the number of cylinders operating at the different loads. Further, a cylinder fuel injection amount may set a cylinder's load. For example, a cylinder operating without fuel injection may be considered deactivated, while a cylinder operating with low fuel injection may be considered to be operating under low-load.

Alternator 116 may be connected in series to one, or more, rectifiers (not shown) that convert the alternator's electrical output to DC electrical power prior to transmission along the DC bus 117. Based on the configuration of a downstream electrical component receiving power from the DC bus, one or more inverters 118 may be configured to invert the electrical power from the electrical bus prior to supplying electrical power to the downstream component. In one embodiment of locomotive 100, a single inverter 118 may supply AC electrical power from a DC electrical bus to a plurality of components. In an alternate embodiment, each of a plurality of distinct inverters may supply electrical power to a distinct component. It will be appreciated that in alternative embodiments, the locomotive may include one or more inverters connected to a switch that may be controlled to selectively provide electrical power to different components connected to the switch.

A traction motor 120, mounted on a truck 122 below the main engine housing 102, may receive electrical power from alternator 116 via the DC bus 117 to provide traction power to propel the locomotive. As described herein, traction motor 120 may be an AC motor. Accordingly, an inverter paired with the traction motor may convert the DC input to an appropriate AC input, such as a three-phase AC input, for subsequent use by the traction motor. In alternate embodiments, traction motor 120 may be a DC motor directly employing the output of the alternator 116 after rectification and transmission along the DC bus 117. One example locomotive configuration includes one inverter/traction motor pair per wheel-axle 124. As depicted herein, six pairs of inverter/traction motors are shown for each of six pairs of wheel-axle of the locomotive. In alternate embodiments, locomotive 100 may be configured with four inverter/traction motor pairs, for example. It will be appreciated that in alternative embodiments, a single inverter may be paired with a plurality of traction motors. Traction motor 120 may also be configured to act as a generator providing dynamic braking to brake locomotive 100. In particular, during dynamic braking, the traction motor may provide torque in a direction that is opposite from the rolling direction thereby generating electricity that is dissipated as heat by a grid of resistors 126 connected to the electrical bus. In one example, the grid includes stacks of resistive elements connected in series directly to the electrical bus. The stacks of resistive elements may be positioned proximate to the ceiling of main engine housing 102 in order to facilitate air cooling and heat dissipation from the grid.

Air brakes (not shown) making use of compressed air may be used by locomotive 100 as part of a vehicle braking system. The compressed air may be generated from intake air by compressor 128.

A multitude of motor driven airflow devices may be operated for temperature control of locomotive components. The airflow devices may include, but are not limited to, blowers, radiators, and fans. A variety of blowers (not shown) may be provided for the forced-air cooling of various electrical components. For example, a traction motor blower to cool traction motor 120 during periods of heavy work, an alternator blower to cool alternator 116 and a grid blower to cool the grid of resistors 126. Each blower may be driven by an AC or DC motor and accordingly may be configured to receive electrical power from DC bus 117 by way of a respective inverter.

Engine temperature is maintained in part by a radiator 132. Water may be circulated around engine 106 to absorb excess heat and contain the temperature within a desired range for efficient engine operation. The heated water may then be passed through radiator 132 wherein air blown through the radiator fan may cool the heated water. The radiator fan may be located in a horizontal configuration proximate to the rear ceiling of locomotive 100 such that upon blade rotation, air may be sucked from below and exhausted. A cooling system comprising a water-based coolant may optionally be used in conjunction with the radiator 132 to provide additional cooling of the engine.

An on-board electrical energy storage device, represented by battery 134 in this example, may also be linked to DC bus 117. A DC-DC converter (not shown) may be configured between DC bus 117 and battery 134 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the placement of an intermediate DC-DC converter may not be necessitated. The battery may be charged by running engine 106. The electrical energy stored in the battery may be used during a stand-by mode of engine operation, or when the engine is shut down, to operate various electronic components such as lights, on-board monitoring systems, microprocessors, processor displays, climate controls, and the like. Battery 134 may also be used to provide an initial charge to start-up engine 106 from a shut-down condition. In alternate embodiments, electrical energy storage device 134 may be a super-capacitor, for example.

Lubrication system 140 includes a pressure fed oil system with a crank driven oil pump for lubricating the engine crankshaft, valves, and pistons. A reservoir of oil may be stored in a sump below the engine. The valves are lubricated with splash oil while the cylinder liners are lubricated by the pressurized oil being fed into the piston, off the crankshaft, for both cooling and lubricating purposes. Carry-over of oil into the combustion chamber is controlled by the piston rings. As such, the piston rings may be shaped to allow enough oil to reach the top piston ring and lubricate it when the cylinder is working at full load. Gas pressure balance in the piston ring grooves further controls carry-over of oil into the combustion chamber. Oil drains out below the oil control ring and as the piston moves up and down the cylinder liner, the oil control ring removes the majority of this oil by scraping. The remaining oil is carried by the remaining piston rings to provide them the needed lubrication. If the oil gets heated during passage around the engine, it may be cooled by passage through radiator 132.

Exhaust stack 142 receives exhaust gas from engine 106 and directs it away therefrom. Ducts or tubing (not shown) may be provided between the crankcase (holding the lubricating oil) and the exhaust stack 142 for ventilating the crankcase, for example, for ventilating blow-by gas from the crankcase.

Lubrication system 140 may be configured to supply sufficient oil for a full load operation. However, at light loads, an excess amount of oil may be supplied, and some of the excess oil may be carried into the cylinder chamber and exhaust port. Oil in the combustion chamber may originate from oil retained in the grooves of the cylinder liner walls. As such, the engine may retain some oil in the grooves to provide lubrication for the pistons and rings. Carry-over oil into the combustion chamber may also be contributed by oil lubricating the valves. Herein, oil moves down the valves to provide lubrication between the valve and the valve guide, and further at the seating surface of the valve on the cylinder head. When the engine has accumulated few hours of operation, the oil carry-over condition may be more severe and the condition may be exacerbated by the carry-over of excess lubrication oil into an associated turbocharger over a period of time. Thus, controller 110 communicating with the engine system may be configured to enable a port heating routine, as further elaborated in FIGS. 2-3, to allow the unburned oil to be burned off and avert degraded engine performance due to accumulation of unburned oil. It will be appreciated that the routine may also allow unburned fuel, as may have accumulated in the combustion chamber due to poor fuel combustion under low load conditions, to also be burned off.

Figure 2:
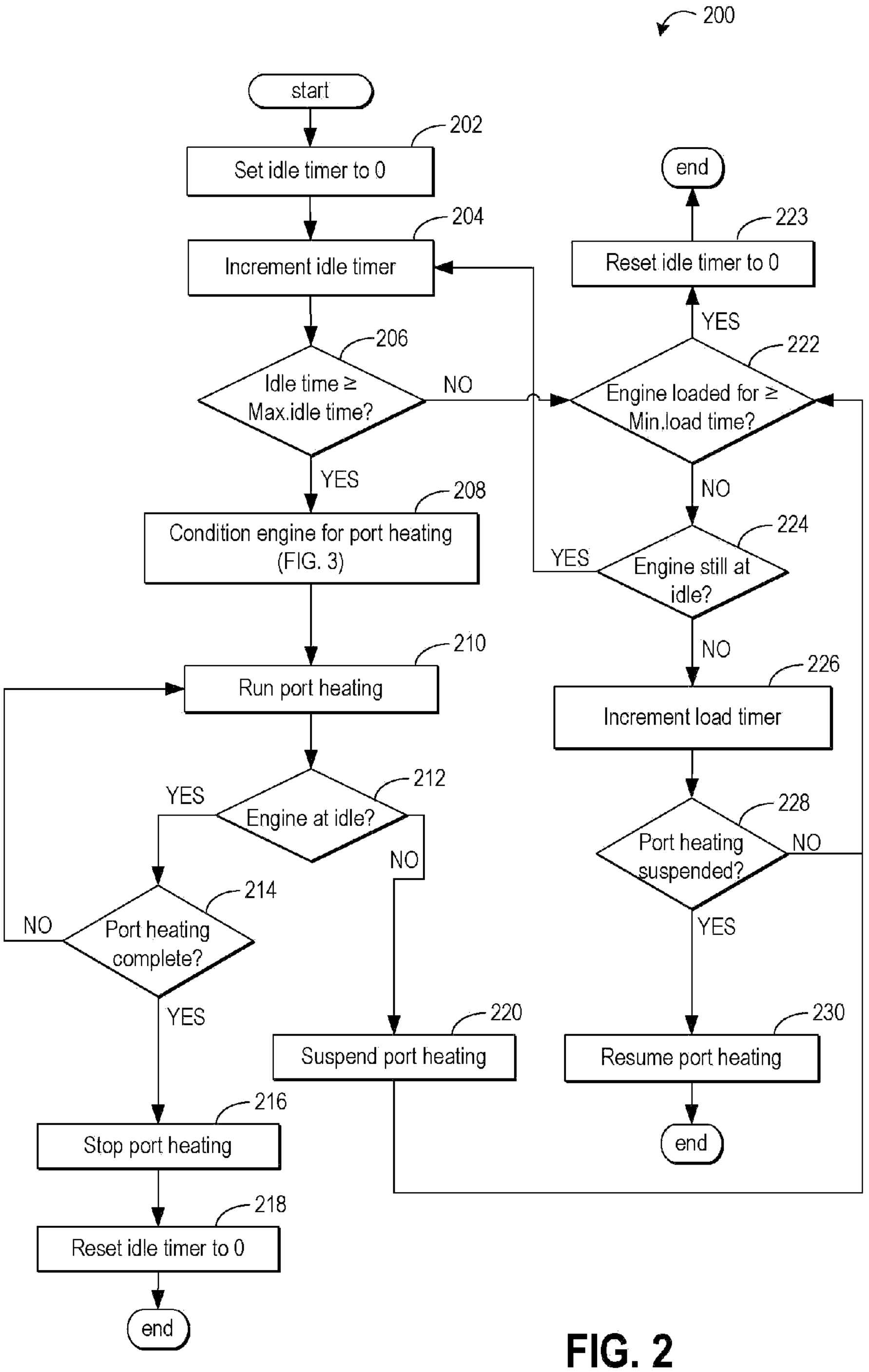
FIG. 2 shows a high level flow chart for a control system configured to enable port heating based on engine load conditions and idling times.

FIG. 2 depicts an example routine 200 that may be performed by a control system, such as by controller 110, in communication with the engine to enable exhaust port heating and subsequent burning of unburned oil and/or fuel. The operation may consider engine operating conditions, such as an engine idling condition, idling time, engine load, engine loading time, and accordingly initiate a port heating operation. The port heating operation may be temporarily suspended or cancelled upon changes in engine operating conditions and/or load conditions, and then restarted or resumed at a later time.

In one example, the port heating operation includes successively operating distinct subsets of cylinders at a cylinder load or fuel injection amount sufficient to increase an exhaust temperature of the subset for burning unburned fuel and/or oil deposited in the subset of cylinders and/or exhaust system, while operating the engine in an overall low-load mode or an idle mode. During such operation, each successively operated subset of cylinders may include at least one, but fewer than all, of the plurality of cylinders. And, cylinders that are not currently being operated in the subset are operated in a low- or no-fuel mode. The successive operation may include first operating a subset of cylinders in the port heating mode, and then operating a different subset of cylinders in the port heating mode, and so on. Further, the distinct subsets may have cylinders in common, but each subset is different from the others in terms of at least one cylinder. In this way, it is possible to remove hydrocarbon deposits from the exhaust of all of the cylinders.

In another example, the port heating may include operating the engine in at least two modes, a first mode with a lower fuel injection amount, and a second mode with a higher fuel injection amount. Specifically, the operation may include operating at least one of the cylinders of the engine in the second mode while at least another cylinder operates in the first mode to increase exhaust temperature at least of the at least one cylinder in the second mode after a designated amount of low-load engine operation, and during the low-load engine operation. Thus, even though the overall engine load is low, select cylinders can operate with a high cylinder load to thereby generate sufficient exhaust port temperatures to remove deposits, at least for that cylinder. Then, by changing which cylinders operate in each mode, different cylinders can have their respective exhaust systems cleaned of deposits. Such operation may continue until all cylinders have been operated with port heating, or until the engine load is increased away from idle or low-load operation (e.g., due to traveling conditions of the locomotive). In such cases, if the engine operates at higher load sufficiently, the port heating may be discontinued (e.g., any cylinders that had not yet been operated in the second mode would have been cleaned by the higher load operation, and thus it may be unnecessary to resume the port heating). However, if the load conditions were not sufficiently high, or for too short of a duration, the port heating may resume where it left off.

It should be appreciated that when operating the engine in a low-load or idle mode with some cylinders (e.g., one or more) operating at lower loads and others (e.g., one or more) at higher loads, various grouping of cylinders may be used. For example, 1 cylinder may operate at a high cylinder load, where the remaining cylinders operate at low-load, such that the overall engine operates under idle or low-load conditions.

Examples of the above operation, along with still further variations and additional operations are now described referring specifically to FIG. 2. At 202, an idle timer is started and an initial setting of time zero is indicated. The idle timer may measure an amount of time spent by the engine in idling conditions. In one example, the idling conditions may include the locomotive parked on a siding for a long term with the engine running at an idling speed. At 204, the idle timer is incremented based on the time spent in idle mode. At 206, it is determined whether the time spent in idle mode is greater than a predetermined maximum idle time. In one example, the pre-specified maximum idle time is 6 hours. If yes, then at 208, the engine may be conditioned for port heating. Note that the idle time may be a continuous idle time without interruptions of other operating modes, or may include a plurality of idle conditions which together reach the maximum idle time.

Also, while the depicted example uses fulfillment of idle timer criteria for enabling port heating, in alternate embodiments, other criteria may be used in addition to the idle timer requirements. As one example, an engine idling speed may be determined and if the speed is above a predetermined port heating speed limit, port heating may be disabled. As elaborated further in FIG. 3, the conditioning procedure may include identifying a first target cylinder where port heating may be initiated and the order of cylinders to follow. Further, the procedure may entail determining injection settings, slew rates, and port heating speeds. Once the engine has been appropriately conditioned, a port heating operation may be run at 210. Alternatively, if routine 200 is being restarted after a previously interrupted port heating operation, then at 210, the operation may be resumed.

Following running of (or resumption of) the port heating procedure, at 212, it is determined whether the engine is in idle conditions. If the engine is idling, then at 214, it may be determined whether the port heating procedure has been completed or not. If the port heating procedure has been completed, further port heating may be stopped at 216 and the idle timer may be reset to zero at 218. However, if at 212 it is determined that the engine is not idling, that is, it is determined that the engine is operating at a higher load condition, port heating may be suspended at 220. The routine may then continue at 222 to determine if the engine load conditions meet a load timer criteria, as further elaborated below. As such, unburned oil and/or fuel accumulation may occur during prolonged engine idling conditions. However, during engine operation at non-idling conditions, the engine exhaust manifold can incur temperature rises that can spontaneously burn off the accumulated unburned oil and/or fuel. Thus, during engine operation at non-idling conditions, the port heating procedure may not be necessitated, and accordingly may be suspended. In this way, the routine may adjust a port heating operation to occur when the engine is idling and thus when the possibility of unburned oil accumulation is higher. The routine may accordingly suspend the port heating operation when the engine is running at higher loads and thus when the unburned oil may be burned off during the normal course of the engine's operation.

Various operations may trigger suspension of the port heating mode, as noted herein. While operation at high load is one example, various others may also occur. For example, speed restrictions may cause the routine to suspend the port heating operation. The speed restriction may include the setting of a minimum engine speed above which the engine speed is maintained, and as such the port heating mode may be suspended. The speed restriction may be requested due to cold ambient temperatures, an operator throttle request, engagement of an auxiliary load, etc.

Returning to 206, if the amount of time spent in idle conditions is not greater than the maximum idle time, then at 222, it is determined if the engine has been loaded for a minimum load time. Also, upon suspension of port heating operations of a loaded engine at 220, the routine may continue to determine whether a minimum load timer duration has been met at 222. If the engine has been loaded for at least the minimum load time, then further port heating may not be needed in anticipation of exhaust temperature rises sufficient to burn off the accumulated unburned oil and/or fuel. Accordingly, at 223, port heating may not ensue and the idle timer may be reset to zero.

However, if neither the maximum idling time is met at 206, nor the minimum load time is met at 222, then at 224, it is determined if the engine is still at idle conditions. If the engine is still idling, the routine may return to 204 to continue incrementing the idle timer, and thereafter proceed with the port heating operation when the idling time criteria has been met. If the engine is not idling at 224, then at 226, the routine may continue incrementing the load timer instead. At 228, it is verified whether a port heating operation had been suspended on a previous iteration of the routine. If so, the routine may resume the port heating operation at 230. If a previous port heating had not been interrupted, then the routine may return to 222 and continue incrementing the load timer until the minimum load time is reached following which the need for the port heating operation may be negated and consequently the idle timer may be reset to zero.

As such, two criteria may be considered in the determination of whether or not to proceed with a port heating procedure. These criteria may be a time spent in an idling mode (as may be defined by an idle timer) and an engine load condition (as may be defined by a load timer and/or a loaded or non-idle condition of the engine). It will be appreciated that the accumulation of unburned oil and/or fuel may be a potential issue during idle or low engine load conditions, and further that during operation of the engine in a sufficiently loaded condition of sufficient duration, the temperature of the exhaust manifold may be raised enough to allow the unburned fuel and oil to be burned during the course of loaded-engine operation.

In one example scenario, the engine is in idling conditions and has spent enough time in idling conditions to warrant a port heating operation to avert adverse effects of accumulated unburned oil. In this situation, where the idle timer criterion is met, a port heating operation may ensue. Upon completion of the operation, the idle timer may be reset to allow a new iteration of the operation to follow. In another example, the engine is not idling, but instead is loaded. Herein, the engine may have spent enough time in the loaded condition to fulfill the load timer criterion and ensure high exhaust manifold temperatures such that a port heating operation may not be required. Herein, as long as the engine is operating in non-idle conditions, and the load timer criterion is met, the idle timer may remain at zero.

In yet another example, the engine has been idling, but not for long enough to fulfill the idle timer criterion. Further, the idling condition of the engine may be interrupted by a sudden operation of the engine in a loaded condition. If the interrupting operation of the engine in the loaded condition continues long enough to fulfill the load timer criterion, then the exhaust manifold temperatures may again be expected to reach desirable high temperatures to allow the unburned oil to be burned off, such that upon returning to idling conditions, a port heating operation may not be required, and as such the idle timer may be reset to zero. However, if the interrupting operation of the engine in the loaded condition is not long enough to fulfill the load timer criterion, then upon completion of the loaded engine operation, the engine may return to an idling condition and resume determination of idle timing.

In still another example, the engine has idled long enough to fulfill the idle timer criterion and has proceeded to run a port heating operation. However, the port heating operation may be interrupted by a sudden operation of the engine in a loaded condition. First of all, the idle condition-interrupting running of the engine will cause the port heating operation to be suspended. Next, if the engine is run long enough to fulfill the load timer criterion, then unburned oil and/or fuel may be purged and thus the port heating operation may be aborted and the idle timer may be returned to zero in anticipation of a new iteration. However, if the engine is run only for a short amount of time (e.g., not enough to fulfill the load timer criterion) and then returned to idle conditions, the port heating operation may be resumed in anticipation of a need to purge the unburned oil and/or fuel. In this way, a control system may be configured to anticipate accumulation and/or burning of unburned oil in an engine exhaust manifold based on the amount of time spent by the engine in idling conditions vis-à-vis running (or loaded) conditions. Accordingly, by judiciously adjusting the operation of a port heating routine, potential issues related to unburned oil buildup may be averted. Further details of a preconditioning procedure, as well as a running and resumption of a port heating operation, will be elaborated in the context of an example routine 300 of FIG. 3 and with prophetic examples in FIGS. 4A-B.

Figure 3:
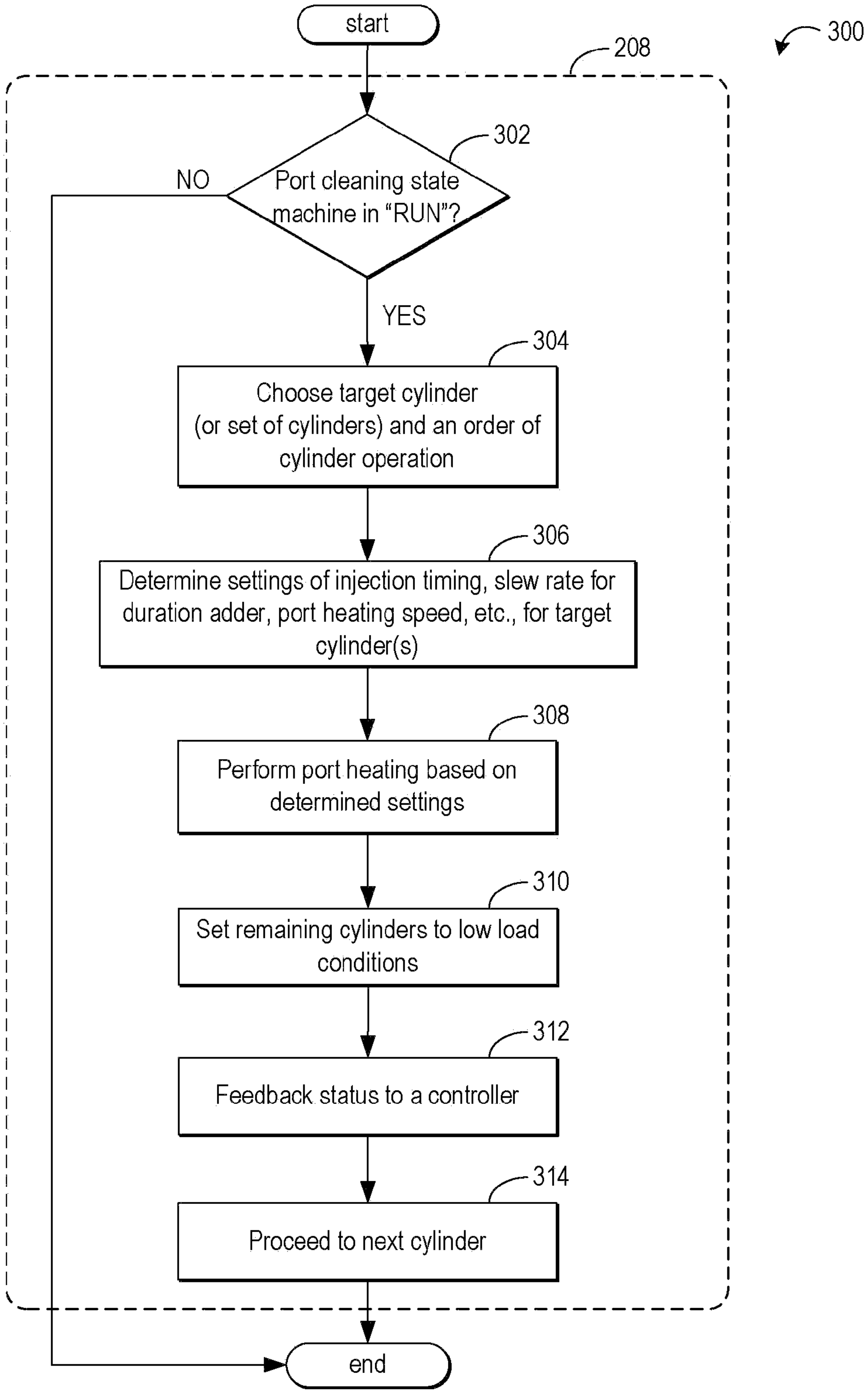
FIG. 3 shows a high level flow chart for a conditioning routine that may be performed to prepare an engine for an ensuing port heating procedure.

FIG. 3 depicts an example routine 300 that may be performed by a control system to condition an engine for a subsequent running of (or resumption of) a port heating operation. As such, routine 300 may be performed as part of the conditioning step of routine 200, at 208. The routine determines an order of cylinders to be purged of their unburned oil buildup. The routine allows an injection timing, a slew rate and a port heating speed to be adjusted responsive to various parameters, including sudden interruptions during the port heating operation.

At 302, it is determined whether a port heating state machine is in a "RUN" mode (versus a "HOLD" mode). The routine may continue if the run mode has been selected, which in turn requires all the port heating operation criteria to be met. If the state machine is not in the run mode, then the routine may end. At 304, a target cylinder is selected for initiating the port heating operation. Alternatively, a set of cylinders may be selected for initiating the port heating operation. Further, a subsequent order of cylinder purging operation may be determined. As one example, in an engine operating with 12 cylinders, cylinder 1 may be selected to be the target cylinder followed by cylinders 2 through 12, in that order, where cylinders are numbered successively from the front of the engine to the back on one bank, and then from the back to the front on the other bank. In another example, for the same engine, a set of four cylinders (such as cylinders 1-4) may be selected as the target set, followed by the set of cylinders 5-8 and 9-12, in that order. Still another example applies to various engine configurations, such as where the engine is a V-12 engine with two banks of 6 inline cylinders having a log-type exhaust manifold for each bank. Specifically, in this configuration, the order of port heating may include starting with a cylinder located furthest from the exhaust manifold exit (e.g., cylinder 1 where the log manifold exit is located closest to cylinder 6), and successively port heating each of cylinders 1 through 6, thereby performing port heating in the cylinder closest to the exhaust manifold exit (e.g., 6) after the other cylinders in the bank (e.g., 1-5). In this way, the cylinder that may have the greatest accumulation of exhaust hydrocarbons (e.g., cylinder 6) can have the possibility of seeing the longest duration of high temperature exhaust.

The order may also be selected based on a firing order, or based on the manifold configuration, for example from front to back. As such, selection of a target set of cylinders (such as a set of 2 or 4 cylinders) allows even firing to occur and reduces the occurrence of misfiring and potential vibration issues. However, selection of a single cylinder allows a faster response to sudden requests for high load engine operation, as may be required for example during a sudden need to charge a battery, or to compress air for air brakes. Further, the cylinder or cylinder groups may be selected to take advantage of previously heated neighboring cylinders.

At 306, port heating settings for the target cylinder may be determined. These may include settings for an injection timing, a slew rate for a duration adder, a port heating speed and the like. The slew rate may be adjusted to slowly increase the fueling in the targeted cylinder so as to minimize smoke formation. The slew rate may be determined by testing a variety of values and based on which value best meets the emission requirements. As one example, the duration adder angle may be set to 6 degrees of crank angle. That is, the target cylinder may be injected with fuel for 6 additional crankshaft degrees over the remaining cylinders. Further, this may be slewed in over a time period of 60 seconds. This operation would result in a slew rate of 0.1 degrees per minute. Thus, when transferring the cylinder operating mode from a low cylinder load to a high cylinder load, the fuel injection amount may be gradually ramped from a low fuel injection amount to a high fuel injection amount at a slew rate set based on operation conditions (e.g., engine speed, engine temperature, etc.) to thereby reduce potential smoke generation due to the mode transition. Likewise, when transitioning from a high cylinder load mode to a low cylinder load mode, the cylinder fuel injection may be gradually decreased at a slew rate for the additional advantage of reducing impacts on idle speed control and inadvertent idle speed dips and/or engine stalls.

The remaining settings may be based on a target port heating speed (e.g., target idle speed) for the chosen cylinder. The target idle speed may be set to a higher idle speed during port heating (as compared to a lower idle speed during non-port heating conditions) to further increase exhaust temperatures. In one example, the target speed may be compared to an actual (or current) speed. A fuel injection quantity may accordingly be computed to correspond to an amount that may hold the actual speed at the target speed. The duration of the injector current may in turn be adjusted to correspond to the computed fuel injection quantity. A port heating duration may be computed as a sum of the injector current duration and a port heating offset amount. In one example, the port heating duration may be 7 minutes. Once the settings have been established, they may be communicated to the target cylinder and at 308, port heating may be provided in the target cylinder based on the determined settings. At 310, the remaining cylinders (that is the cylinders not part of the target set selected at 304) may be set to low cylinder load conditions. The calculated duration of injector current, as determined at 306 for the target cylinder, may also be communicated with the remaining cylinders at 310. At 312, a status update may be fed back to a controller upon completion of port heating in the target cylinder. At 314, the routine may then proceed to the next target cylinder in the order determined previously at 304.

In this way, the cylinder exhaust ports of an engine may be sequentially and periodically heated to allow unburned oil within to be evaporated and/or combusted, thereby reducing undesirable buildup of fuel in the exhaust ports and exhaust stack. By adjusting the port heating operation responsive to an amount of time spent by the engine in an idling condition, and further based on an engine load condition, exhaust maintenance may be automated and human intervention may be reduced.

Further, the above operation illustrates how idle speed control may be coordinated with the port heating operation. Specifically, in addition to fuel adjustments for selected cylinder sub-sets, additional idle speed control fuel adjustment to one or all of the cylinders may be used to maintain idle speed and reject disturbances due to various auxiliary loads (such as the brake compressors, battery charging, etc.).

Note that in addition to the above described differential cylinder operation used to increase exhaust temperature, additional operations may further be included to further increase exhaust temperature, including: intake throttling, reduction of EGR, retarding of injection timing, and combinations thereof. For example, when operating some cylinders at higher cylinder load and others at lower cylinder load to port heat the cylinders at higher load, the cylinders at higher cylinder load may utilize retarded injection timing relative to the cylinders at lower cylinder load.

Figure 4A:
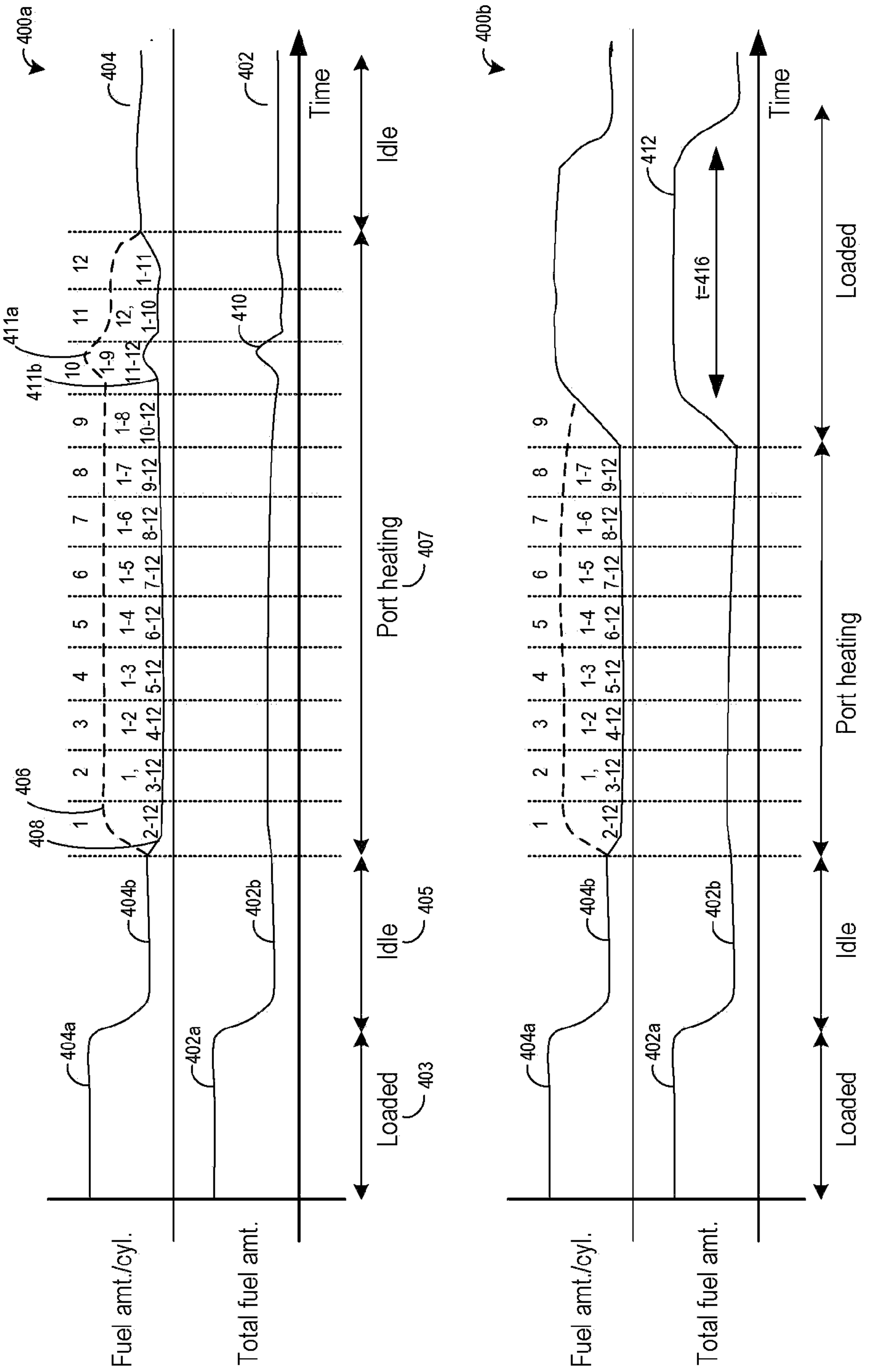
FIGS. 4A-B depict prophetic examples of operation according to FIGS. 2-3.
Figure 4B:
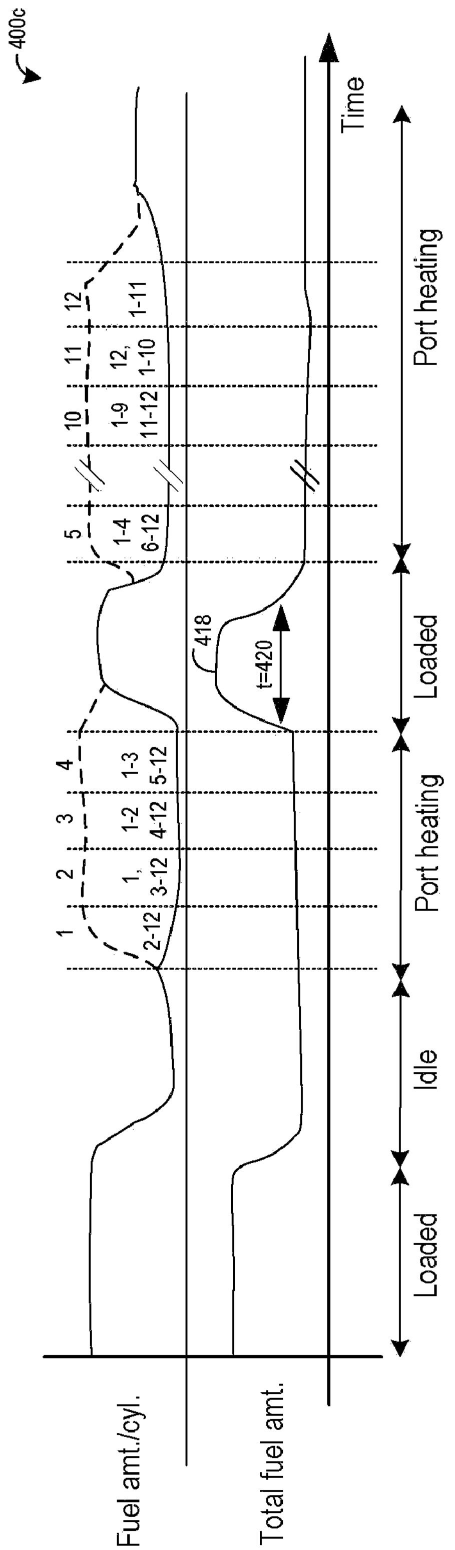

The various possibilities of the port heating routine will be further detailed by example scenarios elaborated herein below and in the prophetic examples of FIGS. 4A-B. Specifically, FIGS. 4A-B further detail the concepts introduced in FIGS. 2-3 through the use of example case scenarios in maps 400*a*-*c*. It will be appreciated that the numbering introduced in map 400*a* is used herein to represent similar parts in maps 400*b*-*c*. Map 400*a* graphically represents changes in the total engine fuel consumption 402 (along y-axis) and corresponding changes in individual cylinder fuel consumption 404 (along y-axis) during engine operation (as time, along x-axis), including during a port heating operation. As such, the engine may be in an engine high-load mode 402*a,* such as during a loaded condition 403, or an engine low-load mode 402*b,* such as during an idle condition 405 and a port heating condition 407. The overall engine fuel consumption 402 during the port heating condition 407 may be an engine low-load 402 *b*, similar to that during idle conditions 405. In the same way, the cylinders may operate with a cylinder high-load 404*a* during the loaded engine condition or a cylinder low-load 404*b* during the idle engine condition. Further, when the engine is in a port heating condition 407, the cylinders may be differentially operated such that some cylinders are operated in cylinder high-load and some cylinders are operated in cylinder low-load, such that the net fuel consumption of the engine during the port heating condition may remain at an engine low-load.

As shown in map 400*a,* during an initial loaded engine condition 403, the engine may operate at engine high-load 402*a* with a large amount of fuel being consumed. Correspondingly, the cylinders may also operate at cylinder high-load 404*a* during this time. During an ensuing engine idle condition 405, the total fuel consumption of the engine drops as the engine shifts to an engine low-load mode 402*b*. Correspondingly, a reduced amount of fuel is consumed by the cylinders, which may now also operate with a cylinder low-load 404*b*. Once the engine has spent sufficient time 409 in the idle mode, and an idle timer criterion has been fulfilled, the engine may commence the port heating operation. As previously elaborated in FIG. 3, an engine conditioning step may precede the port heating. Herein a target cylinder may be selected wherein port heating may be initiated, and a subsequent order of cylinder port heating may be determined. In the depicted example, the engine has 12 cylinders and cylinder 1 is the target cylinder where port heating is to be initiated, followed by cylinders 2-12 in that order. Thus, to allow the target cylinder to be purged of accumulated unburned oil and/or fuel without affecting the total amount of fuel consumed by the engine (that is, to stay constant at the engine low-load 402*b*), the cylinders may be differentially fuelled and operated. The target cylinder (Cyl. 1) may be shifted to an adjusted cylinder high-load 406 (dotted line), while the remaining cylinders (Cyl. 2-12) may be shifted to an adjusted cylinder low-load 408 (solid line). This ensures a desired increase in the temperature of only the target cylinder exhaust port to enable evaporation of the oil built up therein. As the exhaust port heating procedure continues, the target cylinder operated at the adjusted cylinder high load 406 may gradually shift from cylinder 1 to cylinder 12 (as depicted by the transitioning cylinder label for dotted line 406) via all the intervening cylinders, based on the predetermined order of port heating operation. In this way, all the cylinder ports may be cleaned by the end of the port heating operation, without having affected the engine's overall fuel consumption. Thus immediately following cylinder 1, cylinder 2 may be operated at adjusted cylinder high-load 406. Similarly, immediately following cylinders 2-12, cylinders 1 and 3-12 may be operated at adjusted cylinder low-load 408. The same may continue until all the 12 cylinders have been sequentially purged of their unburned oil. Thereafter, the engine may be returned to the engine low-load 402*b,* that is an engine idle condition 405, and the cylinders may resume a cylinder low-load 404*b* operation.

During engine idle condition 405, a sudden disturbance may cause a sudden surge in the required engine output, as reflected by a sudden surge 410 in engine load and fuel requirements during the port heating of cylinder 10. As such, during surge 410, the engine temporarily shifts to an engine high-load 402*a*. In one example, a sudden increased engine output may be desired if an on-board energy storage device (such as battery 134) has fallen below a desired state of charge and the engine output is required to return the battery to the desired state of charge. In another example, a sudden increased engine output may be desired if the compressor air pressure has fallen below a desired range, and the compressor needs to be run to return the air pressure to the desired value. Thus, in response to the sudden increase in engine demand, and the shift of the engine to the high-load 402*a,* all the cylinders may incur a corresponding surge 411*a*-*b* in fuel consumption. When the surge conditions have abated, the cylinders may return to their respective adjusted cylinder high-load 406 or cylinder low-load 408, thereby ensuring that the engine operation has also been returned to an engine low-load 402*b* and idling conditions 405.

Map 400*b* depicts a similar scenario with the cylinders operating differentially at the adjusted cylinder high or low-load (406 or 408) during an engine port cleaning operation. In the depicted example, following the port heating of cylinders 1-8 (that is during the port heating of cylinder 9), the engine may be shifted out of idling conditions and run at engine high-load 402*a,* as shown at 412. The high-load operation of the engine may be of a long duration 416. During this long duration high-load engine operation, port heating of cylinder 9 (and subsequent cylinders) may be suspended, and all the cylinders may also be shifted to a cylinder high-load 404*a*.

Consequently, at the end of the loaded operation 412, it may be determined that the long duration 416 was long enough that the exhaust manifold temperature of all the cylinders would have risen high enough and evaporated any residual unburned oil therein. Thus, at the end of the long duration high-load mode of loaded engine operation 412, when the engine and cylinders are returned to a low-load (402*b* and 404*b*), the port heating operation may be reset, instead of resumed.

In contrast, map 400*c* depicts a shorter duration loaded engine operation 418 that interrupts the port cleaning of cylinder 5. Herein, the duration 420 of the operation 418 may not be deemed long enough to enable the exhaust ports to be cleaned during the loaded operation. Thus, at the end of operation 418, when the engine is returned to a low-load and idling condition, the cylinders may resume port heating. Herein, the interrupted port heating of cylinder 5 may be resumed first, and then the predetermined order of cylinder port heating may ensue. It will be appreciated that in alternate embodiments, when an engine shut-down is requested by an automatic engine start-stop control routine, the port heating operation may be stopped, and the differential operation of at least one of the cylinders operating in the different modes (that is, in either the cylinder high-load or low-load) may be changed, or disabled.

Note that the example control and estimation routines included herein can be used with various engine, ship, and/or locomotive system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for a vehicle comprising, an internal combustion engine with a plurality of cylinders;

a lubrication system coupled to the engine, the lubrication system configured to provide sufficient oil for high-load engine operation and to provide more than sufficient oil for low-load engine operation;

a control system configured to adjust a cylinder operating mode among at least a first mode and a second mode, the first mode being a low cylinder load and the second mode being a high cylinder load, where, during engine idling, the control system is further configured to: monitor a duration of idle time, and when the monitored idle duration reaches a threshold idle time, initiate a port heating operation including operating one engine cylinder in the second mode while remaining cylinders operate in the first mode, and successively operating different cylinders in the second mode of the port heating operation.

2. The system of claim 1 wherein the control system is further configured to continue adjusting operation of the cylinder among the first and second modes until all the cylinders have been operated in the second mode for a threshold duration.

3. The system of claim 1 wherein the control system is further configured to continue adjusting operation of the cylinder among the first and second modes until the engine idle condition ends.

4. The system of claim 3 wherein the control system is further configured to resume the port heating operation if the engine load after idling was less than a threshold load or was continued for less than a threshold duration.

5. The system of claim 4 wherein the control system is further configured to resume the port heating operation by continuing the successive operation until all the cylinders have been operated in the second mode for a threshold duration.

6. The system of claim 5 wherein the vehicle is a locomotive.

7. A method for operating an internal combustion engine having an exhaust system and a plurality of cylinders that utilize fuel and/or oil for combustion and engine lubrication purposes, the method comprising:

while the engine is operating in a low-load mode or an idle mode, successively operating distinct subsets of said cylinders at a cylinder load sufficient to increase an exhaust temperature for burning unburned fuel and/or oil deposited in the cylinders or engine exhaust system;

wherein each successively operated subset comprises at least one but fewer than all of the plurality of cylinders; and wherein cylinders that are not currently being operated in a subset are operated in a low -or no-fuel mode.

8. The method of claim 7 wherein the engine is operated in an idle mode, and wherein for each successively operated subset, the cylinders that are not in the subset are operated in a no-fuel mode.

9. The method of claim 7 wherein the distinct subsets include a single cylinder.

10. The method of claim 7 further comprising: adjusting fuel injection to one or more cylinders to control idle speed while successively operating the distinct subsets to increase the exhaust temperature.

11. The method of claim 10 wherein fuel injection is adjusted to all cylinders of the engine to control idle speed while successively operating the distinct subsets to increase the exhaust temperature.

12. The method of claim 7 wherein the engine is operating in a locomotive.

13. A method for operating an internal combustion engine with a plurality of cylinders, the cylinders operating in at least two modes, a first mode with a lower fuel injection amount, and a second mode with a higher fuel injection amount, the method comprising:

after a designated amount of low-load engine operation, and during low-load engine operation, operating at least one of the cylinders of the engine in the second mode while at least another cylinder operates in the first mode to increase exhaust temperature at least of the at least one cylinder in the second mode.

14. The method of claim 13 further comprising: changing which of the cylinders operates in the modes until at least one of the following conditions is reached:

each cylinder has operated in the second mode for a threshold duration, or low-load engine operations ends.

15. The method of claim 13 further comprising changing which of the cylinders operates in the modes until the engine operates with the engine load greater than a threshold high-load for a duration sufficient to remove unburned oil from the engine.

16. The method of claim 14 wherein the low-load engine operation includes idle operation.

17. The method of claim 13 wherein the second mode includes a high cylinder load and the first mode includes a low cylinder load.

18. The method of claim 13 further comprising: changing which of the cylinders operates in the modes; and disabling the operation in at least the second mode when an engine shut-down is requested by an automatic engine start-stop control routine.

19. The method of claim 13 further comprising: changing which of the cylinders operates in the modes based on a cylinder order, where a manifold exit-side cylinder closer to an exhaust manifold exit location operates in the second mode after other cylinders.

20. The method of claim 13 further comprising: retarding injection timing of fuel for the cylinder in the second mode relative to injection timing of fuel for the cylinder in the first mode.

21. The method of claim 13 further comprising transitioning a cylinder from the first mode to the second mode by ramping fuel injection amounts below a threshold slew rate to reduce smoke production.

22. The method of claim 13 further comprising: suspending operation in the second mode based on an engine speed restriction, said speed restriction generated based on a locomotive operating condition or an operator request.

* * * * *